United States Patent [19]
Aoki et al.

[11] Patent Number: 5,364,167
[45] Date of Patent: Nov. 15, 1994

[54] STRUCTURE OF SEAT CUSHION FRAME IN A VEHICLE SEAT

[75] Inventors: Akira Aoki; Takashi Yasui; Yoshihiro Mizushima; Mitsuru Fukushima, all of Akishima, Japan

[73] Assignee: TACHI-S Co. Ltd., Akishima, Japan

[21] Appl. No.: 138,628

[22] Filed: Oct. 19, 1993

[51] Int. Cl.$^5$ ............................................. B60N 2/00
[52] U.S. Cl. ........................ 297/452.18; 297/452.23; 297/452.24
[58] Field of Search ................ 297/452.18, 452.21, 297/452.23, 452.24, 452.26

[56] References Cited

U.S. PATENT DOCUMENTS

| | | | |
|---|---|---|---|
| 2,641,311 | 6/1953 | Ingram, Jr. et al. | 297/452.18 |
| 3,656,807 | 4/1972 | Arida et al. | 297/452.26 X |
| 4,236,751 | 12/1980 | Strien | 297/216 |
| 4,969,687 | 11/1990 | Higuchi et al. | 297/452.18 |

*Primary Examiner*—Peter R. Brown
*Attorney, Agent, or Firm*—Oldham, Oldham & Wilson Co.

[57] ABSTRACT

A structure of seat cushion frame in a vehicle seat, which has a pair of upwardly projected side frames, one of them being disposed at the side of a door of the vehicle, wherein such one of the side frames is formed with a cut-away portion at the rearward are thereof, with a forward side frame being thus defined therein, and wherein an expandable member is extended between the cut-away portion and forward side frame. The expandable member acts to allow vertical flexure of the corresponding lateral bolster portion of seat cushion, after upholstering the seat cushion frame to form the seat cushion, so that a passenger can descend from or climb onto the seat with a comfortable touch.

5 Claims, 3 Drawing Sheets

STRUCTURE OF SEAT CUSHION FRAME IN A VEHICLE SEAT

BACKGROUND OF INVENTION

1. Field of the Invention

The present invention relates to a structure of seat cushion frame in a vehicle seat, such as an automotive seat.

2. Description of Prior Art

Ordinarily, in descending from a vehicle seat or particularly from an automotive seat, a passenger will put his or her thigh or buttocks on one lateral bolster portion of a seat cushion of the seat which faces towards the door of automobile. Thus, a weight of the passenger is exerted on that seat cushion bolster portion. Considering this passenger's behavior and weight load, there has been known a reinforced structure of seat cushion frame as shown in FIG. 1.

FIGS. 1 to 3 illustrate this conventional seat cushion frame structure.

With particular reference to FIG. 2, it is observed by the imaginary line that a passenger (M) is about to descend from a seat, putting his or her thigh on one lateral bolster section (SC1') of seat cushion (SC') to apply most of his or her weight thereto.

FIG. 1 shows the conventional seat cushion frame (F) of a pan type having a standing side frame (11) fixed on the left-side lateral frame section (F1) and a reinforcement side frame (10) provided fast on the right-side lateral frame section (F2). The reinforcement side frame (10) is to face towards the door of automobile (DS) when assembling it with a seat upholstery into a cabin of the automobile (not shown).

The seat cushion (SC') is formed by upholstering the seat cushion frame (F) with a foam cushion member (C') and a covering member (S') as shown in FIG. 3.

In the FIG. 3, designation (SC1') denotes a lateral bolster portion of the seat cushion (SC') disposed at the side of door of automobile (DS), where the weight of passenger (M) is frequently applied as mentioned above. The reinforcement side frame (10) is provided beneath such lateral bolster portion (SC1') in order to (i) receive the thigh or buttocks of passenger (M) with a stable supporting touch, (ii) avoid extreme lowering of that particular bolster portion (SC1') and (iii) resist a great load from the passenger's weight.

The reinforcement side frame (10) is welded at one lateral edge thereof to the upper surface of right-side frame section (F2) of seat cushion frame (F), extending generally along the whole length-wise direction of seat cushion frame (F) and projecting upwardly therefrom to the same level with that of the left side frame (11).

In this connection, as can be seen from FIG. 2, it has been noticed that what is mostly pressed by the passenger's thigh or buttocks is the rearward upper area of the door-side bolster portion (SC1'). Hence, according to this conventional seat cushion (SC'), it would be preferred to make relatively thick that rearward upper area of bolster portion (SC1') as indicated by (C1') in FIG. 3. However, this would increase the height of the door-side bolster portion (SC1'), resulting in a hindrance against the descending or climbing action of the passenger from or onto the seat cushion (SC') because there would be a more frequent contact between the bolster portion (SC1') and the passenger's legs or buttocks. On the contrary, even if the layer portion (C1') of cushion member (C') is made smaller in thickness, the upper wall (10a) of reinforcement side frame (10) will be felt hard unpleasantly by the passenger, which deteriorates the advantages of reinforcement side frame (10) for allowing the passenger to smoothly descend from or climb onto the seat with a comfortable touch.

SUMMARY OF THE INVENTION

With the above shortcomings in view, it is thus a purpose of the present invention to provide an improved structure of seat cushion frame in a vehicle seat, which permits a passenger to smoothly descend from or climb onto the seat with a comfortable touch of contact between his or her thigh and buttocks portions and the pertinent area of lateral bolster or side support portion of a seat cushion of the seat.

In order to achieve such purpose, according to the present invention, there is provided a structure of seat cushion frame having a pair of side frames projected upwardly and extending in a longitudinal direction thereof, wherein a cut-away portion is formed in a rearward area of one of said side frames disposed at a side of a door of vehicle, with a forward side frame being thus defined therein, and an expandable means is extended between the cut-away portion and forward side frame.

Accordingly, a vertical resilient flexibility is given by the expandable means to the rearward area of the lateral bolster portion where a downward load is applied from the thigh and buttocks of the passenger who is descending from or climbing onto the seat. That is, when the passenger climbs onto the seat, his or her thigh and buttocks portions contact that rearward area of bolster portion, but this particular area is easily depressed downwardly by virtue of the vertical flexibility of expandable means, and thereafter, such downwardly deformed area returns quickly to its original shape due to the resilient recovery action of the same expandable means. The passenger can therefore easily descend from or climb onto the seat with a comfortable touch, and further, when he or she sits on the seat, the bolster portion acts as normal firm side support to laterally support or retain his or her thigh and buttocks from the side of door.

In addition, in assemblage of the seat, when upholstering the thus-constructed seat cushion frame with a foam cushion member and a covering member, it is possible to make small in thickness the layer portion of the foam cushion member which overlies those forward side frame and expandable means.

Preferably, the expandable means may comprise a belt member having a vertically resilient expandable property, and the belt member be extended between the cut-away portion and forward side frame at a level substantially equal to a height of the forward side frame. More preferably, the belt member be made of a material flexible only in a vertical direction and not flexible in a horizontal direction relative thereto.

In one aspect of the invention, a wire frame member is provided in the cut-away portion, and this wire frame may consist essentially of a lower longitudinal frame section extending from the forward side frame to a rearward end portion of the seat cushion frame such as to lie generally along the bottom of seat cushion frame, and an upper frame section extending upwardly from that lower longitudinal frame section, the upper frame section being situated at the rearward end portion of seat cushion frame and projecting upwardly to a level equal to a height of the forward side frame. The expandable means or belt member may be extended between the upper frame section of wire frame member and an upper surface of said forward side frame.

All other features and advantages will become apparent form reading of the description hereinafter, with reference to the drawings.

DETAILED DESCRIPTION OF PREFERRED EMBODIMENT OF THE INVENTION

Firstly, it should be understood that the present invention is directed to an improvement based on the previously described prior-art structure of seat cushion frame, and all like designations given in the prior art description correspond to all like ones to be used hereinafter, without repetition of specific explanation on the common constituent parts or fittings therebetween.

Figure 2:
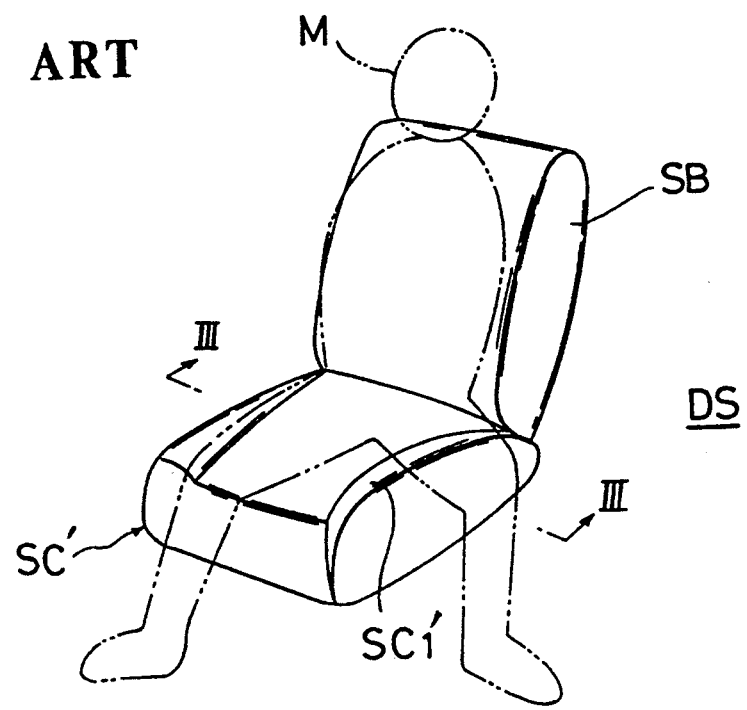
FIG. 2 is a schematic perspective view of a seat in which the conventional seat cushion frame is provided, which explanatorily indicates the state where an passenger is descending from or climbing onto the seat.
Figure 3:
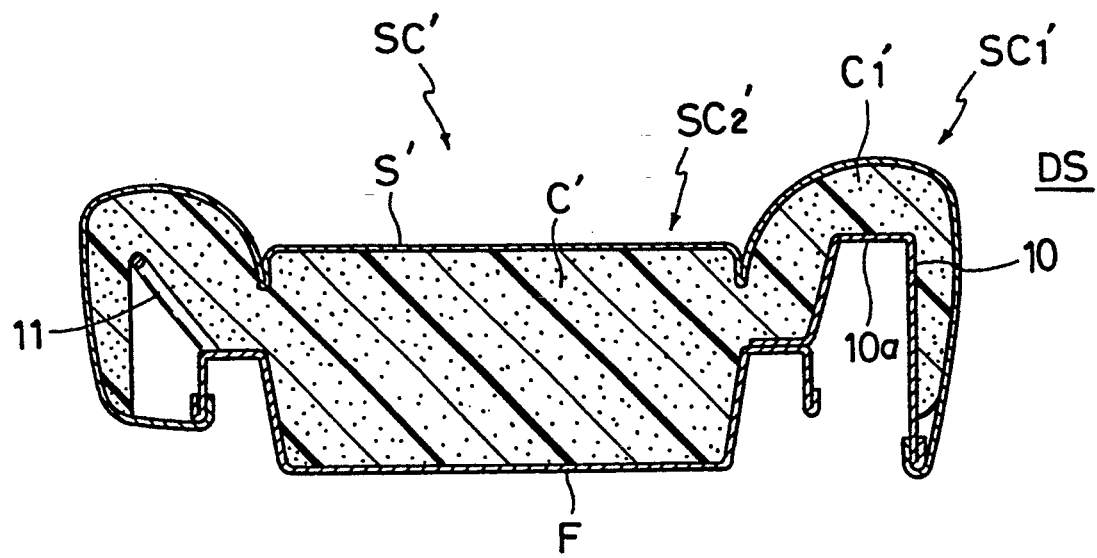
FIG. 3 is a sectional view taken along the line III-—III in the FIG. 1.
Figure 4:
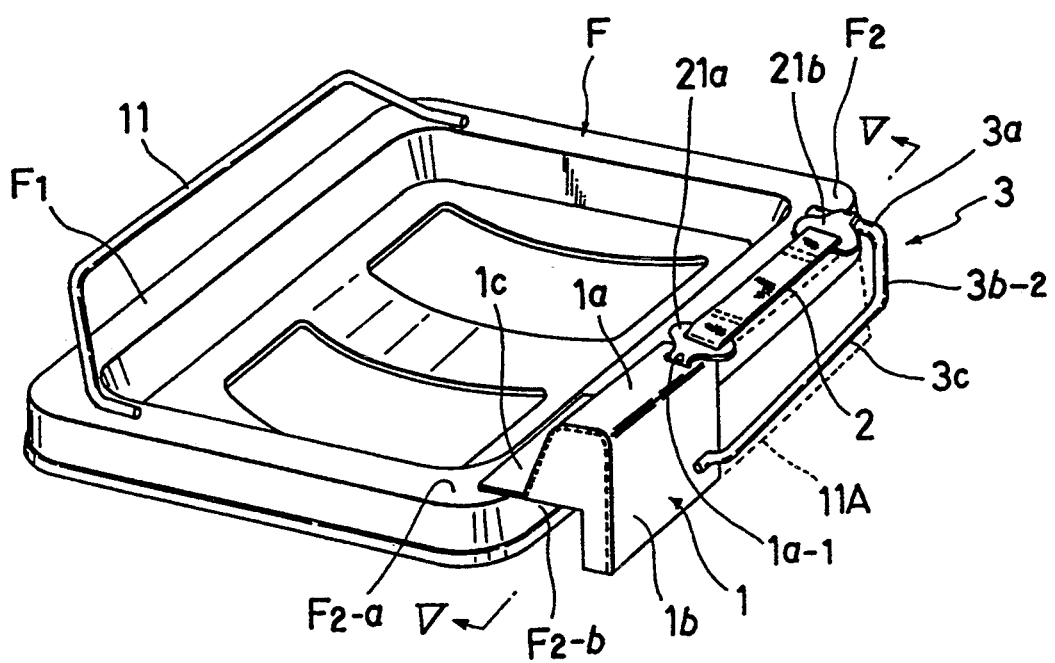
FIG. 4 is a perspective view of a seat cushion frame in accordance with the present invention.
Figure 5:
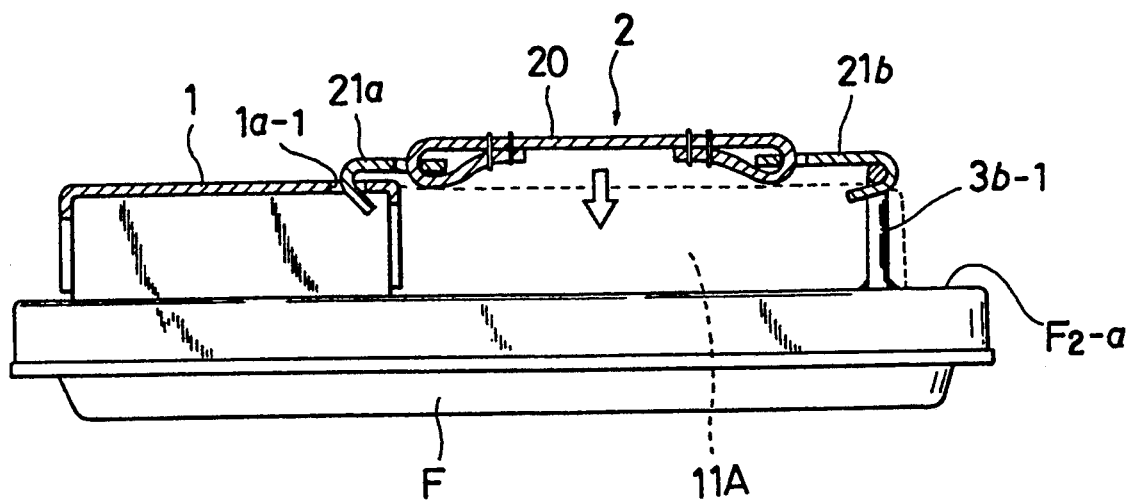
FIG. 5 is a sectional view taken along the line V—V in the FIG. 4.
Figure 6:
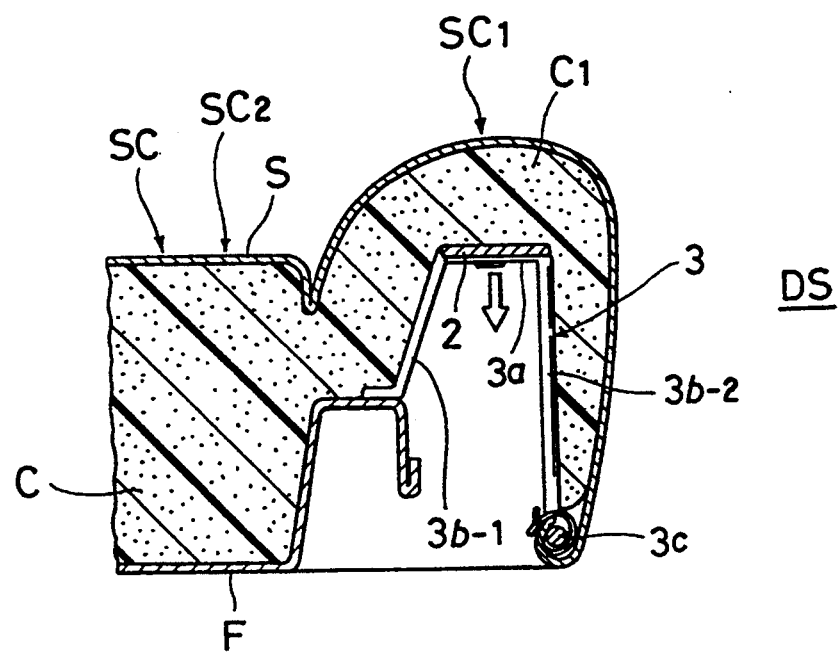
FIG. 6 is a partly enlarged sectional view of a seat to which the seat cushion frame of the present invention is applied.

Referring to FIGS. 4 to 6, there is illustrated one embodiment of seat cushion frame structure in accordance with the present invention, which is used in a vehicle seat, such as an automotive seat shown in FIG. 2.

Figure 1:
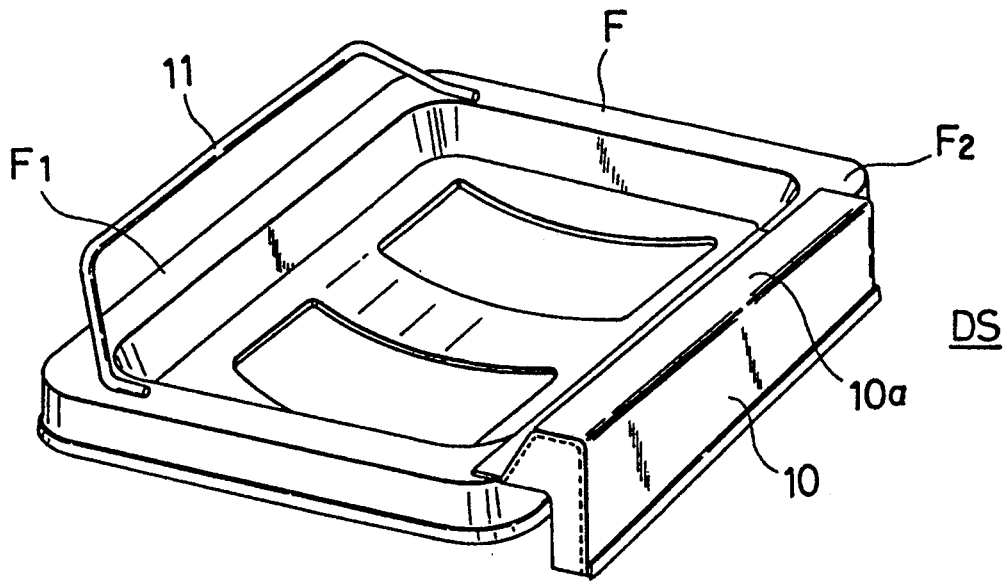
FIG. 1 is a perspective view of a conventional seat cushion frame.

FIG. 4 shows, in the perspective, a seat cushion frame (F) formed basically in the identical manner to the prior-art one in FIG. 1, excepting the left side frame (1) provided on the left-side frame section (F2) thereof.

The left side frame (1) is formed from a rigid metal plate into the illustrated shape by cutting off a rearward portion of the prior-art side frame (11) as indicated by designation (11A) in the phantom line. It is essential that the cut-away portion (11A) be defined at a dimensions corresponding to a range in which the thigh and/or buttocks of passenger (M) (see FIG. 2) will contact and press against the rearward portion of the side frame (11). Hence, the remaining forward portion at (1) serves to laterally support a forward part of the passenger's thigh from the left side, as viewed from FIG. 4. Namely, the side frame (1) constitutes a forward side frame, whereas in the cut-away portion (11A), a wire frame member (3) and an expandable belt-like member (2) are disposed.

As can be seen from FIGS. 4, 5 and 6, the frame member (3) is formed by a lower longitudinal section (3c), a pair of spaced-apart upstanding vertical sections (3b-1)(3b-2) and an upper transverse section (3a). The lower longitudinal section (3c) is at its free end welded fast on the side frame (1) and extends along the longitudinal direction of the seat cushion frame (F) in parallel with the left-side lateral section (F2) thereof. Upwardly extended continuous from that lower longitudinal section (3c) is a left-side one of the two vertical sections, i.e. (3b-2), which terminates at a level same with that of the upper surface (1a) of side frame (1). The upper transverse section (3a) in extended between the two vertical sections (3b-1) (3b-2) in continuous manner, which is oriented in a direction transversely of the seat cushion frame (F) and has a width generally equal to that of the side frame upper surface (1a). As best shown in FIG. 6, another one of the two vertical sections, i.e. (3b-1), is fixed as by welding to the upper surface (F2-1) of left-side frame section (F2) associated with the seat cushion frame (F).

It is thus seen that the wire frame member (3) is formed in a shape generally conforming to the outer contour of the cut-away portion (11A) of side frame (11), so that upholstery comprising a foam cushion member (C) and a covering member (S) may be filled in a whole zone forming a left-side bolster portion (C1) substantially corresponding to that (C1') of the previously stated prior-art seat cushion (SC'), as understandable from FIG. 6.

The expandable band-like or belt member (2) is depicted in FIGS. 4 and 5 as comprising an expandable support belt of an elastic material (20) and a pair of opposed securing hook-like members (21a)(21b), each being connected to both loop-like ends of the support belt (20), respectively. As shown, one hook-like member (21a) is engaged in a hole (1a-1) formed at the upper surface (1a) of side frame (1), while another hook-like member (21b) is engaged over the upper transverse section (3a) of wire frame member (3), whereupon normally the belt member (2) extends on a horizontal plane or generally on the same level with the height of the side frame (1), and further can be yielded resiliently to a downward load in the arrow direction, as shown in FIG. 5. It is important to note that, structurally, the belt member (2) is resiliently flexible in a direction heightwise of the side frame (1), but not flexed in a direction width-wise of the same. In other words, the belt member (2) per se can be flexed vertically but is not flexed horizontally, because the former function allows vertical flexure of seat cushion lateral bolster portion (C1) as will be explained later, while the latter function serves the same rigid side support purpose as the side frame (1) does.

As can be seen in FIG. 6, the upholstery elements, i.e. the foam cushion member (C) and covering member (S), are affixed over the whole seat cushion frame (F) to form the seat cushion (SC), with a lateral bolster portion (C1) (or side support portion, strictly stated.) being defined over the thus-constructed side frame (1, 2 and 3) at the side of a door of automobile (DS). In this regard, as indicated in FIG. 6, one terminal end of the covering member (S) may be firmly secured to the lower longitudinal section (3c) of wire frame member (3) by means of a hog ring or the like.

Accordingly, a vertical resilient flexibility is provided by the belt member (2) to the rearward upper area of the bolster portion (SC1) in question, where a downward load is applied mainly from the buttocks part of a passenger (M) who is descending from or climbing onto the seat as shown in FIG. 2. Namely, when the passenger climbs onto the seat, his or her thigh and buttocks portions contact the upper area of bolster portion (SC1), but this particular area is easily depressed downwardly by virtue of the vertical flexibility of belt member (2), and thereafter such downwardly deformed area returns quickly to its original shape due to the resilient recovery action of the same belt member (2). In this instance, the recovered belt member (2) is transformed into a rigid support element in the width-wise direction thereof as mentioned earlier, thus cooperating with the side frame (1) to act as a normal firm side support to laterally support or retain the passenger's thigh and buttocks portions from the side of door (DS). The same goes for the case where the passenger descends from the seat.

Further, it is appreciated that the layer portion (C1) of foam cushion member (C) (see FIG. 6) may be small in thickness as desired, which eliminates the need for making thicker the corresponding portion as found in the prior art. This is also attributed to the vertical flexible nature of the belt member (2).

While having described the present invention as above, it is noted that the invention is not limited to the illustrated embodiment, but any other modifications, replacements and additions may be applied thereto structurally without departing from the scopes and spirits of the appended claims.

What is claimed is:

1. A structure of seat cushion frame in a seat of a vehicle, comprising a pair of side frames which are provided at both lateral frame portions of said seat cushion frame, respectively, in such a manner as to project upwardly from a plane of said seat cushion frame and extend along a longitudinal direction thereof, and one of said pair of side frames is disposed at a side of a door of said vehicle,
   - a cut-away portion formed in a rearward area of said one of said pair of side frames;
   - a forward side frame which is defined at a forward area of said one of said pair of side frames by forming said cut-away portion;
   - a means for defining area, reward frame portion at a rearward end portion of said one of said pair of side frames: and
   - an expandable means extended between said forward side frame and said means for defining a rearward frame portion provided at a higher level than said plane of said seat cushion frame.

2. The structure as defined in claim 1, wherein said expandable means is made of a material which is resiliently flexible in a vertical direction within said cut-away portion with respect to said one of said pair of side frames, and said expandable means comprises a seat belt member.

3. The structure as defined in claim 1, wherein the means for defining a rearward frame portion at a rearward end portion of said one of said pair of side frames comprises a wire frame member provided in said cut-away portion, said wire frame member comprising a lower longitudinal frame section extending from said forward side frame to a rearward end portion of said seat cushion frame, such as to lie generally along a bottom of said seat cushion frame, and an upper frame section extending upwardly from said lower longitudinal frame section, said upper frame section being situated at said rearward end portion of said seat cushion frame and projecting upwardly to a level equal to a height of said forward side frame, and wherein said expandable means is extended between said upper frame section of said wire frame member and an upper surface of said forward side frame.

4. The structure as defined in claim 3, wherein said expandable means comprises a belt member which is resiliently flexible in a vertical direction, and which is provided with a pair of securing means at both ends thereof, respectively, and wherein, by means of said pair of securing means, said both ends of said belt member are respectively secured to said upper frame section of said wire frame member and said upper surface of said forward side frame.

5. The structure as defined in claim 1, which further includes an upholstery affixed over said seat cushion frame and said pair of side frames, said upholstery comprising a foam cushion member and a covering member, and wherein a layer portion of said foam cushion member, which overlies said forward side frame and expandable means, may be small in thickness.

* * * * *